United States Patent [19]

Connolly et al.

[11] Patent Number: 4,723,352
[45] Date of Patent: Feb. 9, 1988

[54] METHOD OF APPLYING AND REMOVING FLUID ACTUATED NUT

[75] Inventors: James D. Connolly; Darrel Huff, both of Princeton, W. Va.

[73] Assignee: Conn-Weld Industries, Inc., Princeton, W. Va.

[21] Appl. No.: 67,308

[22] Filed: Jun. 29, 1987

Related U.S. Application Data

[62] Division of Ser. No. 748,479, Jun. 25, 1985.

[51] Int. Cl.⁴ .............................................. B23P 19/06
[52] U.S. Cl. .................................... 29/526 R; 29/446; 29/457; 411/434
[58] Field of Search ...................... 29/446, 457, 526 R; 403/15; 411/432, 434, 391, 231

[56] References Cited
U.S. PATENT DOCUMENTS

| 2,571,265 | 6/1946 | Leufven | 29/446 |
| 4,064,783 | 12/1977 | Ess | 411/434 |
| 4,075,923 | 2/1978 | Latham | 29/446 X |
| 4,085,649 | 4/1978 | Christensson | 29/446 X |
| 4,438,901 | 3/1984 | Reneau et al. | 29/452 X |

Primary Examiner—P. W. Echols
Assistant Examiner—Andrew E. Rawlins
Attorney, Agent, or Firm—Wilmer Mechlin

[57] ABSTRACT

A method of applying and removing a fluid actuated nut, the nut having a cylindrical casing engageable at an inner end with a base, the casing containing a coaxial relatively axially shiftable plunger having an inwardly opening partial central bore for threadedly receiving a shank of a bolt, a compression spring acting outwardly on the plunger and inwardly against the casing, and a fluid pressure chamber outwardly of the piston, the nut being applied by screwing the piston onto the bolt shank to the point of engagement of the inner end of the casing with the base and tightened by sequentially compressing the spring by fluid injected under pressure in the fluid chamber for shifting the casing away from the base, turning the casing to reengage the base and releasing the fluid pressure to expand the spring, and repeating the sequence as necessary to produce the desired tensile and/or compressive force, the nut being removed by applying fluid pressure to advance the piston for compressing the spring and disengaging the casing from the base and then unscrewing the piston from the bolt.

5 Claims, 4 Drawing Figures

METHOD OF APPLYING AND REMOVING FLUID ACTUATED NUT

This application is a division of our copending application Ser. No. 748,479, filed June 25, 1985, for a Fluid Actuated Nut.

BACKGROUND OF THE INVENTION

Fluid actuated or operated nuts heretofore proposed are typified by Leufven U.S. Pat. No. 2,571,265, Danly U.S. Pat. No. 2,616,543, Novak U.S. Pat. No. 3,154,006, and Rossman et al U.S. Pat. No. 3,464,044. In all of these patents, a tensile or compressive force is applied by fluid pressure, with the difference that in Leufven and Novak the force, once applied, is transferred to a nut or shim before the fluid pressure is released, while in Danly and Rossman the force is both applied and maintained by fluid pressure and released by discharging the fluid responsible for the pressure. As opposed, in Leufven and Novak relief of the tension on the bolt is achieved by applying fluid pressure to increase that tension and thereby free or loosen for removal the nut in Leufven and shim in Novak.

The concern of the present invention is a method of applying and removing a fluid actuated nut which depends on a spring force for maintaining a bolt under tension and utilizes fluid pressure for compressing and inactivating the spring to facilitate both tightening and removal.

SUMMARY OF THE INVENTION

The primary object of the invention is to provide an improved method of applying and removing a fluid actuated nut depending on compression spring means acting between relatively axially moveable members for exerting a tensile and/or compressive force and on fluid pressure acting between said members in opposition to the spring means for inactivating the spring means during application and removal of the nut.

Another object of the invention is to provide a method of applying and removing a fluid actuated nut having a casing engageable with a base, a relatively axially shiftable plunger in the casing and having an axial bore for threadedly receiving a shank of a bolt, compression spring means in and acting inwardly on the casing and outwardly on the bolt for applying and maintaining a compressive force on the base and a tensile force on the bolt, and a pressure chamber in the casing outwardly of the the plunger and chargeable with fluid pressure for inactivating the spring means, the method including in sequence the steps of screwing the plunger onto the shank of the bolt for engaging the bottom of the casing with the base, charging the pressure chamber with fluid under pressure for compressing the spring means and disengaging the casing from the base, screwing the plunger inwardly on the shank to reengage the casing with the base, and discharging fluid pressure from the pressure chamber for enabling the spring means to apply a tensile force to the shank and a compressive force to the base.

A further object of the invention is to provide a method of applying and removing a fluid actuated nut of the character described in the immediately preceding object, wherein the nut on inactivation of the spring means by fluid pressure is screwed onto and off of the bolt by a manual turning force applied to the casing.

An additional object of the invention is to provide a method of applying and removing a fluid actuated nut of the character described in the preceding "another" object, wherein the casing of the nut has in a top cap thereof charge and discharge ports opening inwardly onto the pressure chamber, and the spring means is activated and inactivated by charging and discharging fluid pressure with and from the pressure chamber respectively through said charge and discharge ports.

The foregoing and other objects and features of the invention will appear hereafter in the detailed description, be particularly pointed out in the appended claims and be illustrated in the accompanying drawings, in which:

FIGURE DESCRIPTION

DETAILED DESCRIPTION

Figure 1:
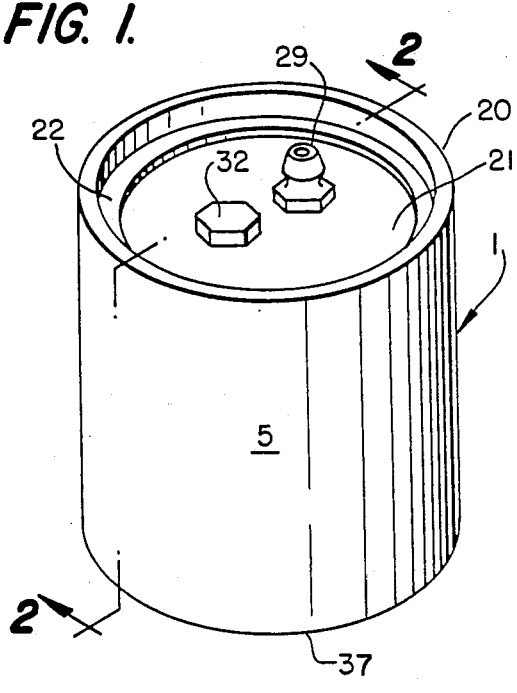
FIG. 1 is a perspective view of an exemplary fluid actuated nut adapted for use with the method of the present invention.

Referring now in detail to the drawings in which like reference characters designate like parts, the improved method of the present invention, when practiced upon the exemplary fluid actuated nut, adapts the nut upon threading onto a bolt, to apply and maintain by a compression spring a tensile and/or compressive force and to have that force relieved by applying fluid pressure for partially or fully compressing the spring.

Designated as 1, the fluid actuated nut exemplary of the type upon which the method of the present invention is practiced, is illustrated as threadedly receiving or screwed onto a shank or shaft 2 of a cooperating connecting, fastening or holding member 3, such as a bolt having a block, ring, hook or other type of head 4 suitable for the intended installation. The nut 1 is comprised of a preferably cylindrical casing or housing 5 containing a concentric or coaxial, relatively axially shiftable or reciprocable plunger or piston 6. Having an internally threaded, inwardly or downwardly opening, outwardly closed or partial central bore 7 for receiving a threaded end portion of the shank 2, the plunger 6 is generally cylindrical with, as an upper or outer part, a head 8 slidably fitting the inside 9 of the side wall 10 of the casing 5 and, as a lower or inner part, an instanding relatively reduced or smaller diameter coaxial stem 11 radially inset from the casing. The plunger stem 11 is slidably received in and adapted to extend or project through a central aperture 12 of a thrust ring 13 radially outwardly engaging the casing's side wall 10 and removably held against inward or downward movement relative to the casing, conveniently by a snap or retainer ring 14.

Occupying, outwardly or upwardly of the thrust ring 13, an annular cavity 15 around the stem 11, is a compression spring 16, which, for its superior performance under heavy loads, suitably is a disc or Bellville spring. Acting between an annular abutment or shoulder 17 on the inner or underside of the plunger head 8 and the thrust ring 13 and reacting against the casing 5 through the thrust ring and the retainer ring 14, the compression spring 16 applies to the plunger an upward or outward force for urging the plunger upwardly or outwardly relative to the casing 5. A set screw 18 extending radially through the side wall 10 of the casing 5 and into an axially aligned slot 19 in a side of the plunger head 8, holds the casing and plunger against relative rotation so that the casing and plunger will rotate or turn in unison in response to any rotative movement imparted to either member.

The casing 5 is closed at or adjacent its top or upper or outer end 20 by a top cap or closure member 21, which may be integral or rigid with the casing or, as illustrated, a suitably cylindrical plug slidably insertable into the casing through its otherwise open upper end and conveniently held therein against relative upward or outward movement by a retainer or snap ring 22. The top cap 21 and plunger 6 bound by their confronting faces or ends the axial limits of a pressure or actuating fluid chamber 23 and are axially spaced by an interposed spacer ring 24, which may be integral with or fixed to either of the members or, as illustrated, a separate washer, for limiting the upward movement of the plunger relative to the top cap and thus ensuring that the pressure chamber always will be at least partly open for receiving fluid under pressure.

The plunger head 8 and, if separate from the casing 5, the cap 21 are peripherally grooved for seating or receiving gaskets, suitably in the form of O-rings 25, for sealingly engaging the side wall 10 of the casing against escape of fluid therebetween. Actuating fluid, indicated at 26, is injected or introduced into the pressure chamber 23 through an inlet or charge port 27 in the cap 21, into an outer end of which is screwed or otherwise inserted an inlet check valve 28 forming part of a fitting 29 suitable for the type of actuating fluid to be employed in the intended installation. The illustrated fitting 29 is a grease fitting for coupling with a grease gun, indicated at 30 by its nozzle, when grease rather than a gas or liquid is to be used as the actuating fluid.

In the operation of the exemplary fluid actuated nut 1, the pressure chamber 23 must be both charged with and discharged of the actuating fluid 26 and the discharge may be through the inlet fitting 29 by using the grease gun or other applicator 30 for opening the check valve 28 to permit the fluid to escape. However, even when the nut is applied to a bolt with a shank diameter as small as about ⅝ inches (1.59 cm), the force applied by the grease gun can be as high as 5,000 lbs. (2265 kg), requiring that the check valve 28 of the fitting 29 be nonleaking under such force. With the applied force of that order, use of the inlet fitting 29 for both charging and discharging the pressure chamber 24 can be bothersome to the operator. It therefore is optional to provide in the cap 21 an outlet or discharge 31, separate and spaced radially from the inlet port 27, and adapting it to control the discharge of grease or other pressurized fluid 26 from the pressure chamber 23. Suitably for that purpose, the outlet port 31 can be fine-threaded for receiving from above a correspondingly threaded, preferably noncorrosive, headed bolt 32 having in a side of its shank 33 an axially extending restricted slot or passage 34 through which the pressurized fluid 26 can be discharged at a controlled rate when the bolt is loosened. The bolt 32 normally is locked in port-closing position by a locknut interposed between its head and the cap 21 and the upper end of the slot 34 preferably is spaced below or terminates short of the locknut. With this construction and the shank 33 desirably extending below the locknut substantially the thickness of the cap 21, the outlet port 31 is sealable against accidental escape of fluid from the pressure chamber 23 by both the seating of the locknut against the cap 21 and the interengaging threads above the slot 34.

The exemplary fluid actuated nut 1 is adapted to apply a tensile or compressive force or both, depending on the use to which it is put. It is particularly valuable in installations, such as vibrators for separating coal or other solids from slurries, in which the vibrating screens are bolted in place and must frequently be removed for repair or replacement. At present the bolts each require two nuts, the second for locking the first in place and, since exposed to the liquid in the slurry, the nuts become corroded and locked or frozen to the bolts in the interval between installation and removal of a screen, in many cases requiring the nuts to be burned off by a torch with consequent destruction of both the nuts and the bolts.

Designed for a long service life, the nut 1 may have the casing 5, cap 21, fitting 29, bolt 32 and locknut 35 made of stainless steel or other noncorrosive material. This, with the casing sealed against entry of moisture through its upper end 20 and in service seated at its bottom or lower or inner end 37 against a mounting base or bracket 38, will protect the plunger 6 from corrosion. In practicing the method of the present invention, upon the nut 1, there are required a bolt or other cooperating member 3 having a threaded shank 2 screwable into the bore 7 in nut's plunger or axially shiftable inside member 6, a supplier or applicator of fluid under pressure, such as the grease gun 30, and that the mounting base 38 be apertured for passing the threaded shank of the cooperating member and of an area sufficient to be engaged and reacted against by the bottom or inner end 37 of the casing or outside member 5. As in the illustrated installation in which the nut 1 is used with a bolt 3 in clamping together a pair of workpieces, the base 38 suitably will be the the confronting face or surface of the adjoining workpiece. Alternately, as in a machine in which a workpiece or working component is mounted under tension, the base 38 can be a platform or mounting bracket on or fixed to the machine's frame.

Figure 2:
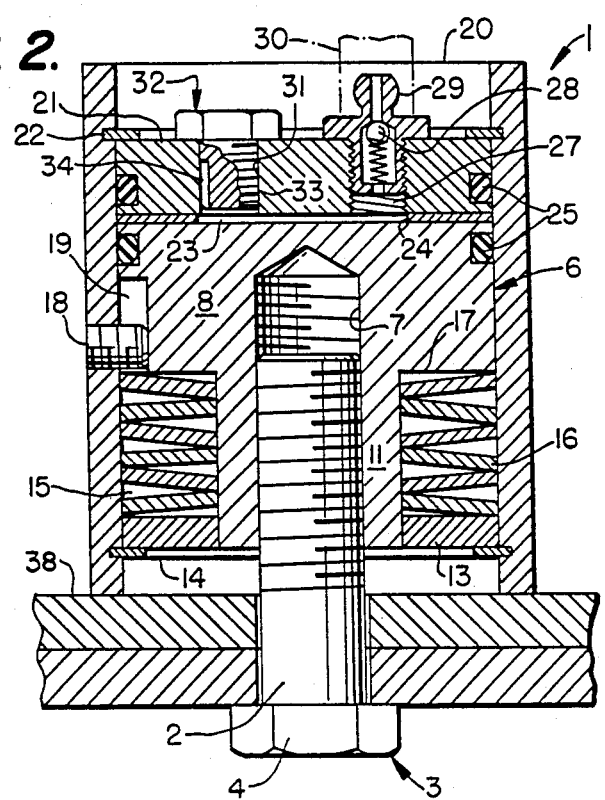
FIG. 2 is a central vertical sectional view of the nut of FIG. 1 showing the nut screwed onto a shank of a bolt with a casing seated on a base.
Figure 3:
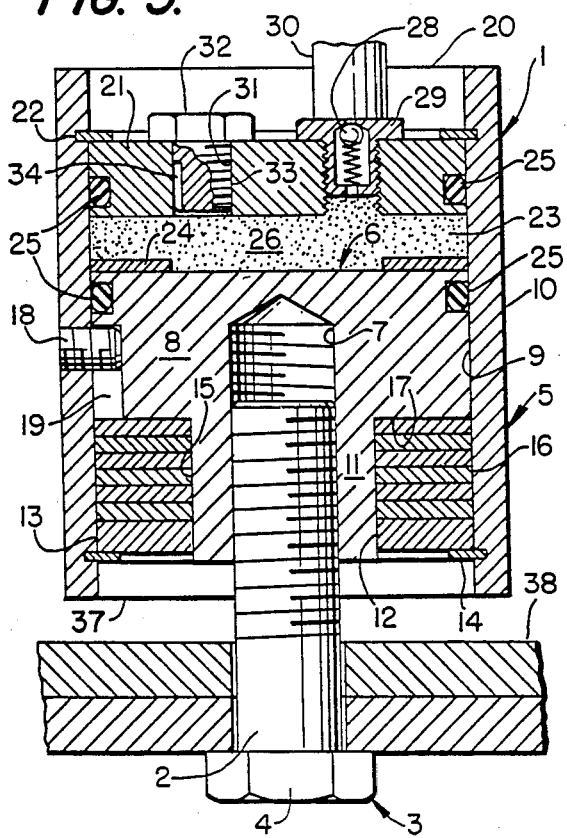
FIG. 3 is a view of the nut of FIG. 2 after charging with fluid under pressure.
Figure 4:
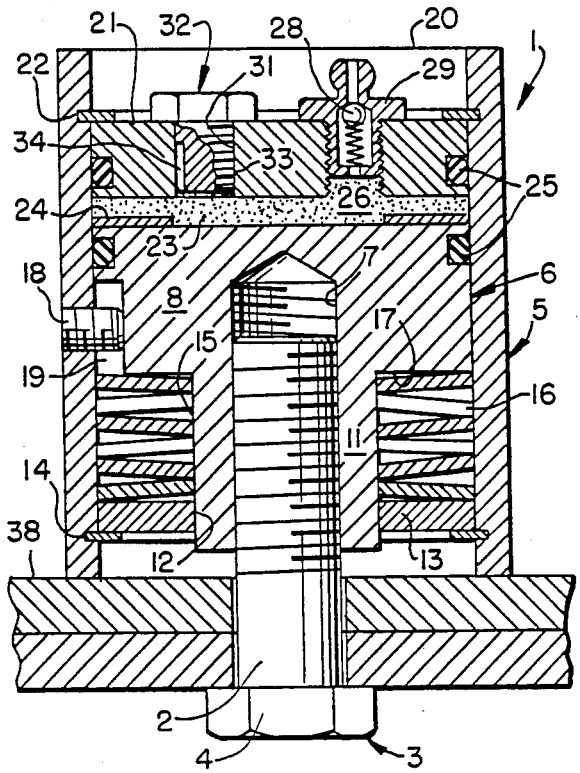
FIG. 4 is a view of the nut of FIG. 3 with the nut screwed down on the bolt shank and the fluid partially discharged for enabling the nut to apply a tensile force to the bolt and a compressive force to the base.

In assembling the nut 1, the compression spring 16 preferably is preloaded or precompressed sufficiently to eliminate that part of its range of compression adjacent its free height in which its capacity to resist compression or potential energy is lowest, and the nut usually will be shipped to a customer without charging the pressure chamber 23. In such case, the nut, in accordance with the method of the present invention, will be applied in the three-step sequence shown in FIGS. 2–4, with the sequence repeated as necessary. In the first step of FIG. 2, the nut is screwed onto the shank 2 of the bolt 3, suitably by turning the casing by hand, until its bottom 37 has engaged the base 38. Fluid under pressure is then injected into the pressure chamber 23 to expand the chamber and drive the plunger 6 inwardly relative to the casing 5, the effect, as shown in FIG. 3, being to shift the casing outwardly relative to the plunger 6 and bolt shank 2 and disengage it from the base 38. In the last step of FIG. 4, the nut is again turned on the bolt shank, suitably by hand, to take up slack in the bolt and reengage the casing 5 with the base 38. At this point the inward force of the fluid pressure on the plunger 6, responsible for compressing the spring 16, is relieved by controlled discharge of fluid from the pressure chamber 23 through the discharge port 31. Then free to expand, the spring 16 in forcing the plunger 6 upwardly in the casing 5, will apply a tensile force to the shank of the bolt and with the bolt's head 4, a compressive force to the interposed workpieces.

If by the steps of the above sequence the desired forces on the bolt 3 and base 38 have not been reached, as because the slack between the nut 1 and bolt 3 has not been fully taken up or the spring 16 has not been fully expanded to its initial preloaded condition, the sequence is repeated until the target force is reached. The forces exerted by the nut will depend on the preselected strength of the spring 16 and the force applied to compress it by the actuating fluid 26 in the pressure chamber 23, but, for an exemplary use in mounting a vibrating screen, usually will range from about 1700 to about 2600 pounds (770–1178 kg).

If, as feasible, the fluid actuated nut is shipped with the pressure chamber 23 precharged with grease or other actuating fluid 26 and the compression spring 16 fully compressed, the application sequence is reduced to two steps, the first, screwing the nut onto the shank 2 of the bolt 3 to take up slack in the bolt and engage the bottom 37 of the casing 5 with the base 38 and the second, controlled discharge of fluid from the pressure chamber through the discharge port 31 for availing of the potential energy of the spring 16 to apply tensile and compressive forces of the desired order respectively to the bolt 3 and the base 38.

Applying and maintaining its tensile and/or compressive force by the spring 16, the nut 1, for removal, requires only injection of fluid into the pressure chamber 23 at a pressure such that the spring will be compressed between the plunger head 8 and thrust ring 13 sufficiently to disengage or loosen the casing 5 from the base 38, at which point it can be removed for reuse by manually turning the casing to unscrew the plunger 6 from the bolt shank 2. The action of the actuating fluid in both application and removal of the nut therefore is to loosen the nut by compressing and deactivating or inactivating the spring 16. By contrast, in prior fluid actuated nuts, the force exerted by the nut is applied by fluid pressure and removal of the nut requires either discharge of the fluid if, as in Danly and Rossman, the fluid pressure is responsible for maintaining the force applied by the nut or, as in Leufven and Novak, applying fluid pressure at an increased force to enable the shim in Danly and nut in Leufven to be removed.

From the above detailed description it will be apparent that there has been provided an improved method of applying and removing a fluid actuated nut which depends on a compression spring for applying a tensile and/or compressive force and on an actuating fluid for compressing and deactivating the spring and enabling the nut to be screwed onto and off of a shank of a bolt. It should be understood that the described and disclosed embodiment is merely exemplary of the invention and that all modifications are intended to be included that do not depart from the spirit of the invention and the scope of the appended claims.

Having now described our invention, we claim:

1. A method of applying and removing a fluid actuated nut having a casing, a plunger in and shiftable axially relative to said casing, compression spring means in said casing and acting therebetween and said plunger for urging said plunger outwardly relative to said casing, said plunger having an inwardly opening axial bore for threadedly receiving through a bottom of said casing a shank of a bolt, and a pressure chamber in said casing outwardly of said plunger and chargeable with fluid pressure for inactivating the spring means, the method comprising in sequence the steps of screwing the plunger onto the shank of the bolt for engaging the bottom of the casing with a base, charging the pressure chamber with fluid under pressure for compressing the spring means and disengaging the casing from said base, screwing the plunger inwardly on the shank to reengage the casing with the base, and discharging fluid pressure from the pressure chamber for for enabling the spring means to apply a tensile force to said shank and a compressive force to said base.

2. A method according to claim 1, wherein the plunger is mounted in the casing for relative axial and against relative rotative movement, the plunger is screwed on the shank by a turning force applied to the casing, and the sequence of steps is repeated as necessary to take up slack between the nut and bolt and apply predetermined tensile and compressive forces respectively to the shank of the bolt and the base.

3. A method according to claim 1, wherein the casing of the nut has in a top cap thereof charge and discharge ports opening inwardly onto the pressure chamber, and the spring means are activated and inactivated by charging and discharging fluid pressure with and from the pressure chamber respectively through said charge and discharge ports.

4. A method according to claim 2, wherein the nut is loosened for removal by charging the pressure chamber with fluid pressure for compressing the spring means to shift the casing outwardly relative to the plunger and shank and relieve the base and shank of the compressive and tensile forces, and thereafter unscrewing the nut by a rotative force applied to the casing.

5. A method according to claim 4, wherein the casing is manually rotated for screwing the plunger onto and off of the shank.

* * * * *